US012752833B2

(12) United States Patent
Wang et al.

(10) Patent No.: US 12,752,833 B2
(45) Date of Patent: Oct. 6, 2026

(54) SELF-ENERGY-STORAGE WHEEL CORNER MODULE INTEGRATING OMNI-DIRECTIONAL REDUNDANT STEERING AND ENERGY REGENERATIVE SUSPENSION

(71) Applicant: Jilin University, Changchun (CN)

(72) Inventors: Junnian Wang, Changchun (CN); Yitong Wang, Changchun (CN); Zidong Zhou, Changchun (CN); Zongwen Zhang, Changchun (CN); Zhe Liu, Changchun (CN); Yujing Cao, Changchun (CN)

(73) Assignee: Jilin University, Changchun City (CN)

( * ) Notice: Subject to any disclaimer, the term of this patent is extended or adjusted under 35 U.S.C. 154(b) by 306 days.

(21) Appl. No.: 18/741,953

(22) Filed: Jun. 13, 2024

(65) Prior Publication Data

US 2024/0336298 A1 Oct. 10, 2024

(30) Foreign Application Priority Data

Feb. 20, 2024 (CN) ......................... 202410185640.8

(51) Int. Cl.
*B62D 3/06* (2006.01)
*B60G 3/26* (2006.01)
(Continued)

(52) U.S. Cl.
CPC ................. *B62D 3/06* (2013.01); *B60G 3/26* (2013.01); *B60G 7/005* (2013.01); *B60G 15/062* (2013.01);
(Continued)

(58) Field of Classification Search
CPC .................... B60K 7/0007; B60K 1/04; B60K 2001/0405; B60K 2001/045; B60K 2007/0046; B60K 2007/0061; B62D 5/0421; B62D 5/04; B62D 5/0481; B62D 5/0418; B60G 2500/40; B60G 13/14; B60G 2300/50; B60G 2300/60; B60G 15/02
See application file for complete search history.

(56) References Cited

U.S. PATENT DOCUMENTS 5,060,959 A * 10/1991 Davis ................ B60G 17/0157 280/DIG. 1
6,843,336 B2 1/2005 Chernoff et al.
(Continued)

*Primary Examiner* — Erez Gurari

(57) ABSTRACT

A self-energy-storage wheel corner module integrating omni-directional redundant steering and energy regenerative suspension, including a wheel assembly, a suspension system having an unequal-length double wishbone suspension structure, a first steering system, a drive system, a braking system, a second steering system, an energy storage system and an actuator assembly. The first steering system is a primary steering system, and has low steering delay and excellent maneuverability at high speeds. The second steering system is a redundancy of the first steering system, and contributes to the omni-directional steering of the wheel assembly, which enhances the vehicle maneuverability. A
(Continued)

motor of the second steering system also functions as another actuation motor of the actuator assembly in an idle state to enable the suppression and energy regeneration of the suspension vibration.

10 Claims, 7 Drawing Sheets

(51) Int. Cl.

| | |
|---|---|
| ***B60G 7/00*** | (2006.01) |
| ***B60G 15/06*** | (2006.01) |
| ***B60K 7/00*** | (2006.01) |
| ***B60K 17/04*** | (2006.01) |
| ***B60K 17/22*** | (2006.01) |
| ***B60T 1/06*** | (2006.01) |
| ***B62D 5/04*** | (2006.01) |
| ***B62D 7/18*** | (2006.01) |
| ***B62D 7/20*** | (2006.01) |
| *B60L 50/60* | (2019.01) |

(52) U.S. Cl.

CPC .......... *B60K 7/0007* (2013.01); *B60K 17/046* (2013.01); *B60K 17/22* (2013.01); *B60T 1/065* (2013.01); *B62D 5/0403* (2013.01); *B62D 5/0421* (2013.01); *B62D 7/18* (2013.01); *B62D 7/20* (2013.01); *B60G 2200/144* (2013.01); *B60G 2202/312* (2013.01); *B60G 2204/129* (2013.01); *B60G 2204/416* (2013.01); *B60G 2206/124* (2013.01); *B60L 50/60* (2019.02)

(56) References Cited

U.S. PATENT DOCUMENTS

| | | | | |
|---|---|---|---|---|
| 8,261,865 | B2 * | 9/2012 | Stansbury, III | F03G 7/081 180/65.31 |
| 9,030,033 | B2 * | 5/2015 | Yoo | B60G 13/14 290/1 R |
| 10,985,633 | B2 * | 4/2021 | Shahosseini | F16H 19/04 |
| 11,952,055 | B1 * | 4/2024 | Oh | B62D 5/04 |
| 2003/0037974 | A1 | 2/2003 | Chernoff | |
| 2003/0037975 | A1 | 2/2003 | Chernoff | |
| 2012/0306170 | A1 * | 12/2012 | Serbu | B60G 17/0195 280/5.514 |
| 2012/0313575 | A1 * | 12/2012 | Stansbury, III | B60G 13/14 320/137 |
| 2013/0104534 | A1 * | 5/2013 | Six | F15B 1/027 60/413 |
| 2013/0127175 | A1 * | 5/2013 | Zuo | B60G 13/14 290/1 A |
| 2015/0083508 | A1 * | 3/2015 | Bluethmann | B62D 5/0418 180/204 |
| 2023/0033401 | A1 * | 2/2023 | Wang | B62D 5/0463 |
| 2023/0302860 | A1 * | 9/2023 | Jeon | B60G 3/20 |
| 2024/0017579 | A1 | 1/2024 | Toda et al. | |
| 2024/0026958 | A1 * | 1/2024 | Broadbent | H02K 7/116 |
| 2024/0336298 | A1 * | 10/2024 | Wang | B60G 7/005 |
| 2025/0196912 | A1 * | 6/2025 | Jeon | B60K 7/0007 |

* cited by examiner

SELF-ENERGY-STORAGE WHEEL CORNER MODULE INTEGRATING OMNI-DIRECTIONAL REDUNDANT STEERING AND ENERGY REGENERATIVE SUSPENSION

CROSS-REFERENCE TO RELATED APPLICATIONS

This application claims the benefit of priority from Chinese Patent Application No. 202410185640.8, filed on Feb. 20, 2024. The content of the aforementioned application, including any intervening amendments thereto, is incorporated herein by reference in its entirety.

TECHNICAL FIELD

This application relates to a corner module applied to electric vehicles, and more particularly to a wheel corner module integrating a steering system, a drive system, a braking system, a suspension system, and an energy storage system.

BACKGROUND

The wire-controlled chassis technology, due to its use of multiple chassis actuators that can be actively controlled, enables better performance in vehicle chassis dynamics control. As one of the key subsystems of the chassis-by-wire, compared to the traditional steering, the wire-controlled steering offers advantages such as simpler structure, faster response, and richer functionality. However, due to the lack of mechanical connection between the steering system and the steering wheel, the driving safety is threatened. Therefore, vehicles equipped with wire-controlled steering must consider installing redundant systems to ensure that the vehicle does not lose all steering capability in the case of the primary steering system failure.

Population growth and the urbanization have led to increasingly crowded urban living conditions and gradually complex road traffic. Consequently, traditional vehicles relying solely on front-wheel steering are no longer suitable for complex urban traffic. Therefore, vehicles equipped with four-wheel omni-directional steering functionality, due to their excellent maneuverability, will be more adaptable to the increasingly congested urban traffic in the future.

In addition, passive suspension is difficult to balance people's needs for ride comfort and high-speed handling performance due to its fixed stiffness and damping coefficient. As a result, active suspension technology using actuators has emerged and is gradually being widely used in high-end traditional power and electric vehicles.

Moreover, based on relevant data statistics, the energy density of power batteries has surged by two to three times over the past decade. Therefore, we are inclined to believe that spurred by the surge in automotive electrification, the automotive battery industry will sustain rapid growth. It is foreseeable that in the imminent future, the energy density of batteries will further increase. Future batteries will be capable of being reduced in size to fit into wheel mechanisms, thereby saving more internal space for vehicles to realize self-energy storage for wheel corner modules.

Currently, from the perspective of automotive modular development, the development of car bodies often relies on chassis design, while the design of the chassis structure is primarily determined by the different types of vehicles. However, achieving high integration of wheel corner modules and rapid connection between the wheel corner modules and the body can completely decouple the chassis design from the body design. This means that different vehicle models can share a common body, and only need to replace the corresponding wheel corner module based on different usage requirements, facilitating the adaptation to different driving environments. In summary, there is an urgent need for a self-energy storage wheel corner module that can be quickly assembled and disassembled from the body, integrating four major chassis systems and meeting requirements for wire-controlled steering redundancy, omni-directional steering, and improved suspension performance for smoother driving.

SUMMARY

Based on the usage scenarios of future vehicle and mobility, combined with the current trend of electric and intelligent vehicles, highly integrated chassis, and modular development direction, this application provides a wheel corner module integrating a wheel-side independent drive system, a braking system, an active suspension system with the actuator, a wire-controlled trapezoidal steering system as well as an omni-directional redundant steering system. Additionally, this wheel corner module features easy installation and self-energy storage capabilities.

The application provides a self-energy storage wheel corner module for wire-controlled chassis integrating omni-directional redundant steering and energy regenerative suspension, comprising:

- a suspension system;
- a wheel assembly;
- a first steering system;
- a drive system;
- an actuator assembly;
- a second steering system; and
- an energy storage system;
- wherein the suspension system has an unequal-length double wishbone suspension structure comprising an upper wishbone and a lower wishbone;
- the suspension system comprises a coil spring and a shock absorber;
- the suspension system is configured to cushion road impact, improve riding smoothness, and determine wheel alignment parameters;
- the wheel assembly is connected to the suspension system through a hub bearing;
- the wheel assembly is configured to support a load of a vehicle and transmit torques;
- a braking system is integrated inside the wheel assembly for braking;
- the first steering system is configured as a primary steering system;
- the first steering system is connected to a steering knuckle of the suspension system through a steering rod;
- the drive system is configured to adopt a wheel-side independent drive;
- the drive system is connected to a hub flange of the wheel assembly through a first constant velocity universal joint and a second constant velocity universal joint to provide a driving torque for vehicle motion;
- the actuator assembly is provided at the upper wishbone of the suspension system;
- the actuator assembly is configured to actively control an attitude of the suspension system and recover wheel vibration energy;

the second steering system is configured as a secondary steering system;

the second steering system is connected to the upper wishbone and the lower wishbone of the suspension system respectively through a first pin shaft;

the drive system is provided at a bottom of the second steering system through a first bolt;

the first steering system is provided on a side of the second steering system;

the actuator assembly is mounted on a lower side of a top of the second steering system;

a quick-connection port is provided on an upper side of the top of the second steering system for connection with a body of the vehicle;

the quick-connection port is positioned directly above a wheel-ground contact point;

the second steering system is configured to serve as a redundant system for the first steering system, and serve as an omni-directional steering system to enable agile movement of the vehicle;

the second steering system is further configured to supply a power to the actuator assembly during an idle period and recover excess energy of the power;

the energy storage system is provided inside the second steering system; and the energy storage system is configured to provide electric energy for the drive system, the braking system, the actuator assembly, the first steering system and the second steering system during operation, and recover and store the wheel vibration energy absorbed by the actuator assembly.

In an embodiment, the suspension system comprises:

a shock absorber assembly;

the upper wishbone;

the steering knuckle;

a shock absorber bracket; and the lower wishbone;

wherein the shock absorber assembly comprises the coil spring and the shock absorber;

the coil spring is coaxially arranged with the shock absorber;

an upper portion of the shock absorber assembly is connected to a reinforcement rib of a steering arm of the second steering system through a second pin shaft;

a bottom of the shock absorber assembly is provided with a support rod;

the upper wishbone comprises two first swing arms intersecting with each other;

an intersection of the two first swing arms is provided with a first ball joint socket;

the first ball joint socket is connected to an upper ball joint socket of the steering knuckle through a first ball joint;

an end of each of the two first swing arms away from the intersection of the two first swing arms is provided with a first boss with a first through-hole;

a top surface of the upper wishbone is provided with a first actuator lug;

the shock absorber assembly is configured to move freely through a space between the two first swing arms;

the steering knuckle comprises the upper ball joint socket and a lower ball joint socket;

a connection line between a center of the upper ball joint socket and a center of the lower ball joint socket is configured as a king pin;

a center of the steering knuckle is provided with a second through-hole to mount the hub bearing;

a first brake caliper lug is provided on a first side of the steering knuckle;

a steering rod support arm is provided on a second side of the steering knuckle;

the first side of the steering knuckle is opposite to the second side of the steering knuckle;

an upper portion of the shock absorber bracket is fixedly connected to the support rod through a mounting hole;

a lower portion of the shock absorber bracket is configured to cross the drive system through two arc-shaped arms;

the lower portion of the shock absorber bracket is provided with a lower wishbone lug;

the lower wishbone has an A-shaped structure;

the lower wishbone comprises two second swing arms intersecting with each other and a first cross arm;

an intersection of the two second swing arms is provided with a second ball joint socket;

the second ball joint socket is connected to the lower ball joint socket through a second ball joint;

an end of each of the two second swing arms away from the intersection of the two second swing arms is provided with a second boss with a third through-hole;

a top surface of the first cross arm is provided with a shock absorber lug; and the shock absorber lug is connected to the lower wishbone lug through a third pin shaft.

In an embodiment, the wheel assembly comprises:

a brake caliper;

a wheel rim;

the hub flange; and a brake disc;

wherein the brake caliper is provided with a second brake caliper lug;

the second brake caliper lug is connected to the first brake caliper lug through a second bolt;

an end of the wheel rim is provided with a spoke;

an outer portion of the wheel rim is configured to mount a tire;

a fourth through-hole is provided at a center of the wheel rim;

a first end of the hub flange is connected to the center of the wheel rim through a third bolt;

a second end of the hub flange is connected to the second through-hole through the hub bearing;

a splined hole is provided inside the hub flange;

the brake disc is fixedly connected to the hub flange;

the brake disc is configured to be clamped by the brake caliper; and a gap is provided between the brake disc and the brake caliper.

In an embodiment, the first steering system comprises:

the steering rod;

a steering gear; and a first steering motor;

wherein a first end of the steering rod is provided with a third ball joint socket;

a second end of the steering rod is provided with a fourth ball joint socket;

the third ball joint socket is perpendicular to an axis of the steering rod;

the third ball joint socket is connected to the steering rod support arm through a third ball joint;

the fourth ball joint socket is arranged parallel to the axis of the steering rod;

the steering gear is configured to convert a rotational motion of the first steering motor into a linear motion of the steering rod through a transmission mechanism;

the steering gear is provided with an input port and an output port;
the output port is connected to the steering rod through a fourth ball joint;
the output port is provided with a dust cover;
a housing of the steering gear is provided with a first mounting lug;
an output shaft of the first steering motor is connected to the input port; and
a housing of the first steering motor is provided with a second mounting lug.
In an embodiment, the drive system comprises:
a drive motor assembly; and
an output shaft assembly;
wherein an inner rotor motor and a planetary gear reducer are integrated inside the drive motor assembly;
an output torque from the inner rotor motor is configured to be reduced by the planetary gear reducer to be transmitted to an output shaft of the drive motor assembly;
a housing of the drive motor assembly is provided with a threaded hole;
the output shaft assembly comprises the first constant velocity universal joint and the second constant velocity universal joint;
an input end of the first constant velocity universal joint is in splined connection with the output shaft of the drive motor assembly;
an output end of the first constant velocity universal joint is fixedly connected to an input end of the second constant velocity universal joint;
an output end of the second constant velocity universal joint is in splined connection with the splined hole, and passes through the fourth through-hole; and
the output shaft assembly is configured to transmit the driving torque to the hub flange, and to be axially connected with the wheel rim through an end nut to limit the wheel rim.
In an embodiment, the actuator assembly comprises:
a first lower housing;
a first upper housing;
a third constant velocity universal joint;
a double-row angular contact ball bearing;
a lead screw;
a ball screw nut; and
an upper cover provided with a fourth through-hole;
wherein a bottom of the first lower housing is provided with a second actuator lug;
the first actuator lug is connected to the second actuator lug through a fourth pin shaft;
a top of the first lower housing is provided with a first threaded hole;
a bottom of the first upper housing is provided with an inner boss;
a top of the first upper housing is provided with a flange with a second threaded hole;
a dust cover is provided between the first lower housing and the first upper housing;
an output end of the third constant velocity universal joint passes through the fourth through-hole;
an exterior of the double-row angular contact ball bearing is matched with the first upper housing;
an outer end of the double-row angular contact ball bearing is configured to be axially positioned with the first upper housing through a shaft sleeve and the inner boss;
the lead screw is matched with an inner ring of the double-row angular contact ball bearing;
the lead screw is configured to be axially positioned with an inner end of the double-row angular contact ball bearing through a locking nut and a first shaft shoulder;
a top of the lead screw is in splined connection with the third constant velocity universal joint;
the ball screw nut is boltedly mounted inside the first threaded hole;
the ball screw nut is configured to cooperate with the lead screw to move up and down;
the upper cover is connected to the second threaded hole through a fifth pin shaft;
the fourth through-hole is provided at a middle of the upper cover to avoid interference during operation of the third constant velocity universal joint;
a top of the upper cover is provided with a third actuator lug; and
an axis of the third actuator lug passes through a motion center of the third constant velocity universal joint.
In an embodiment, the second steering system comprises:
the steering arm;
an integrator assembly comprising a second upper housing; and
a corner module output shaft;
wherein the steering arm has an L-shaped bracket structure comprising a second cross arm and a vertical arm;
a first side and a second side of the vertical arm are connected to the third through-hole respectively through a fourth pin shaft; the first side of the vertical arm is opposite to the second side of the vertical arm;
a third side of the vertical arm is provided with a first lug and a second lug;
the first lug is boltedly connected to the first mounting lug;
the second lug is boltedly connected to the second mounting lug;
an inner side of the vertical arm is provided with a first threaded through-hole;
the first threaded through-hole is boltedly connected to the first threaded hole to fix the drive motor assembly;
an inner side of a middle of the steering arm is provided with an upper wishbone lug;
the upper wishbone lug is connected to the first through-hole on the first boss through a fifth pin shaft;
the reinforcement rib is symmetrically provided at a corner of the L-shaped bracket structure;
the reinforcement rib is provided with a second threaded through-hole;
the second threaded through-hole is connected to the upper portion of the shock absorber assembly;
the second upper housing is provided on a lower side of the second cross arm;
a second threaded hole is provided on the second upper housing;
a fifth through-hole is provided on an outer side of the second cross arm;
a first groove is provided throughout an interior of the steering arm to accommodate the energy storage system;
a top of the integrator assembly is boltedly connected to the second threaded hole;
an actuator lifting lug is provided at a lower portion of the integrator assembly;
the actuator lifting lug is connected to the third actuator lug through a sixth pin shaft;
an output end of the integrator assembly extends from a bottom of an inner side of the integrator assembly, and is in splined connection with an input shaft of the third constant velocity universal joint;

the corner module output shaft comprises the quick connection port and a worm gear shaft;

the quick connection port is connected to the body of the vehicle;

a top of the worm gear shaft is connected to the quick connection port through a first cylindrical pin;

a bottom of the worm gear shaft is fixedly connected to an output shaft of the integrator assembly; and a middle of the worm gear shaft is matched with the fifth through-hole through two thrust bearings and a first deep groove ball bearing.

In an embodiment, the energy storage system comprises a battery;

the battery is embedded in the first groove;

the battery is configured to provide electric energy for the drive system, the braking system, the actuator assembly, the first steering system and the second steering system, and store electric energy recovered by the actuator assembly; and the battery is further configured to enhance stiffness of the steering arm.

In an embodiment, the integrator assembly further comprises:

a second lower housing;

a second steering motor;

a shaft part;

a driving gear;

a worm shaft;

a coupling;

a worm wheel;

a torsion spring;

a first coupling sleeve;

a second coupling sleeve;

a shift fork;

a shifting motor;

a driven gear shaft;

a drive bevel gear; and a driven bevel gear shaft;

wherein a top of the second lower housing is boltedly connected to the second threaded hole;

a bottom of the second lower housing is provided with the actuator lifting lug connected to the third actuator lug through the sixth pin shaft;

a plurality of second grooves are provided inside the second lower housing to secure internal components of the integrator assembly;

the second steering motor is boltedly mounted inside the second upper housing and the second lower housing;

the second steering motor is configured to serve as a steering motor of the second steering system and an actuation motor of the actuator assembly;

the shaft part is mounted inside the second upper housing and the second lower housing through a second deep groove ball bearing;

a first end of the shaft part is in splined connection with an output shaft part;

a middle of the shaft part is provided with a second shaft shoulder, a gear spline, and a first snap spring groove;

a second end of the shaft part is provided with a first spline;

a side of the driving gear is provided with a first splined tooth, wherein the first splined tooth is an external splined tooth;

the driving gear is axially fixed with the shaft part through the second shaft shoulder and a first snap spring;

the driving gear is matched with the shaft part through a needle roller bearing;

a middle of the worm shaft is provided with a worm;

a first end of the worm shaft is matched with the second upper housing through a first angular contact ball bearing;

a second end of the worm shaft is matched with the second lower housing through a second angular contact ball bearing;

an outer side of the coupling is provided with a second splined tooth;

an inner side of the coupling is connected to the worm shaft through a first pin hole;

the first pin hole has a cylindrical shape;

the worm wheel is engaged with the worm;

an end of the worm wheel is fixedly connected to the worm shaft;

an exterior of the torsion spring is boltedly connected to the second upper housing and the second lower housing;

an outer end of an interior of the torsion spring is provided with a third splined tooth;

the torsion spring is configured to be connected to the actuator assembly to provide torsional stiffness to the actuator assembly and improve stiffness of the suspension system;

a first splined groove is provided inside the first coupling sleeve;

one end of the first coupling sleeve is provided with a fourth splined tooth;

the fourth splined tooth is configured to be engaged with the third splined tooth for torque transmission;

a middle of an outer side of the first coupling sleeve is provided with a first shift fork groove;

the second coupling sleeve is structurally identical to the first coupling sleeve;

an interior of the second coupling sleeve is in splined connection with the shaft part;

a first end of the second coupling sleeve is connected to the first splined tooth through a fifth splined tooth;

a second end of the second coupling sleeve is connected to the second splined tooth through a sixth splined tooth;

the second coupling sleeve is provided with a second shift fork groove;

the shift fork is connected to the first shift fork groove and the second shift fork groove;

an exterior of the shift fork is provided with a third boss;

the third boss is provided with a second pin hole;

the shifting motor is a linear motor;

a secondary part of the shifting motor is connected to the shift fork through a second cylindrical pin and the third boss;

a primary part of the shifting motor is fixedly embedded inside the second upper housing and the second lower housing;

a first end of the driven gear shaft is provided with a second splined groove, and is in splined connection with the first coupling sleeve;

a middle of the driven gear shaft is provided with a spur gear;

the spur gear is engaged with the driving gear;

a second end of the driven gear shaft is provided with a second spline and a second snap spring groove;

the driven gear shaft is internally matched with the second upper housing and the second lower housing through a third angular contact ball bearing;

the drive bevel gear is fixedly connected to the driven gear shaft through the second spline and a second snap spring;

a first end of the driven bevel gear shaft is provided with a driven bevel gear;

the driven bevel gear is engaged with the drive bevel gear;

a second end of the driven bevel gear shaft is provided with a third spline, and is connected to the third constant velocity universal joint; and the driven bevel gear shaft is integrally matched with the second lower housing through a fourth angular contact ball bearing.

In an embodiment, an operation mode of the wheel corner module comprises an ordinary steering mode, an omni-directional steering mode and a steering failure fault-tolerant mode;

in the ordinary steering mode, the first steering system is configured to be responsible for steering; the first steering system is configured to control a wheel to perform trapezoidal steering based on a hand steering wheel rotation angle signal; the wheel corner module is configured to be locked to lose an omni-directional steering function due to a worm-worm gear self-locking effect; a shifting motor of the second steering system is configured to be controlled to retract to actuate an execution motor of the second steering system to be connected to the actuator assembly; the execution motor and the actuator assembly are configured to function as an actuating motor for active control of the suspension system or recovery of wheel vibration energy;

in the omni-directional steering mode, the first steering system is configured to stay in an idle state, and the shifting motor of the second steering system is configured to extend to actuate the execution motor to be connected to a transmission shaft of the wheel corner module; under the action of the second steering system, the wheel corner module is configured to perform omni-directional steering relative to the body of the vehicle; the shifting motor is configured to actuate the actuator assembly to be connected to a torsion spring, so as to compensate for suspension stiffness loss and ensure suspension rolling stiffness after the execution motor does not perform a suspension actuation function;

in the steering failure fault-tolerant mode, the second steering system is configured to serve as a backup system for the first steering system; and in response to a case that the first steering system suffers from a failure, the second steering system is configured to operate according to a specific situation:

in a case where it is not require to perform steering or it is only required to perform steering at an angle below a threshold angle, the shifting motor is configured to retract to actuate the execution motor to be connected to the actuator assembly; and the execution motor and the actuator assembly are configured to function as the actuating motor for active control of the suspension system or recovery of the wheel vibration energy; the wheel corner module is configured to be locked due to the worm-worm gear self-locking effect; the drive system is configured to be adjusted to implement adaptive differential or differential drive steering by controlling drive torques of left and right wheels, so as to achieve straight driving or minor-angle steering; and in a case where it is required to perform steering at angle above the threshold angle, the shifting motor is configured to extend to actuate the execution motor to be connected to the transmission shaft of the wheel corner module; under the action of the second steering system, the wheel corner module is configured to perform omni-directional steering relative to the body of the vehicle; the shifting motor is configured to actuate the actuator assembly to be connected to the torsion spring to compensate for the suspension stiffness loss and ensure the suspension rolling stiffness after the execution motor does not perform the suspension actuation function.

DETAILED DESCRIPTION OF EMBODIMENTS

Further detailed descriptions of the present application will be provided below in conjunction with the accompanying drawings so as to enable those skilled in the art to implement it with reference to the text of the specification.

Figure 1:
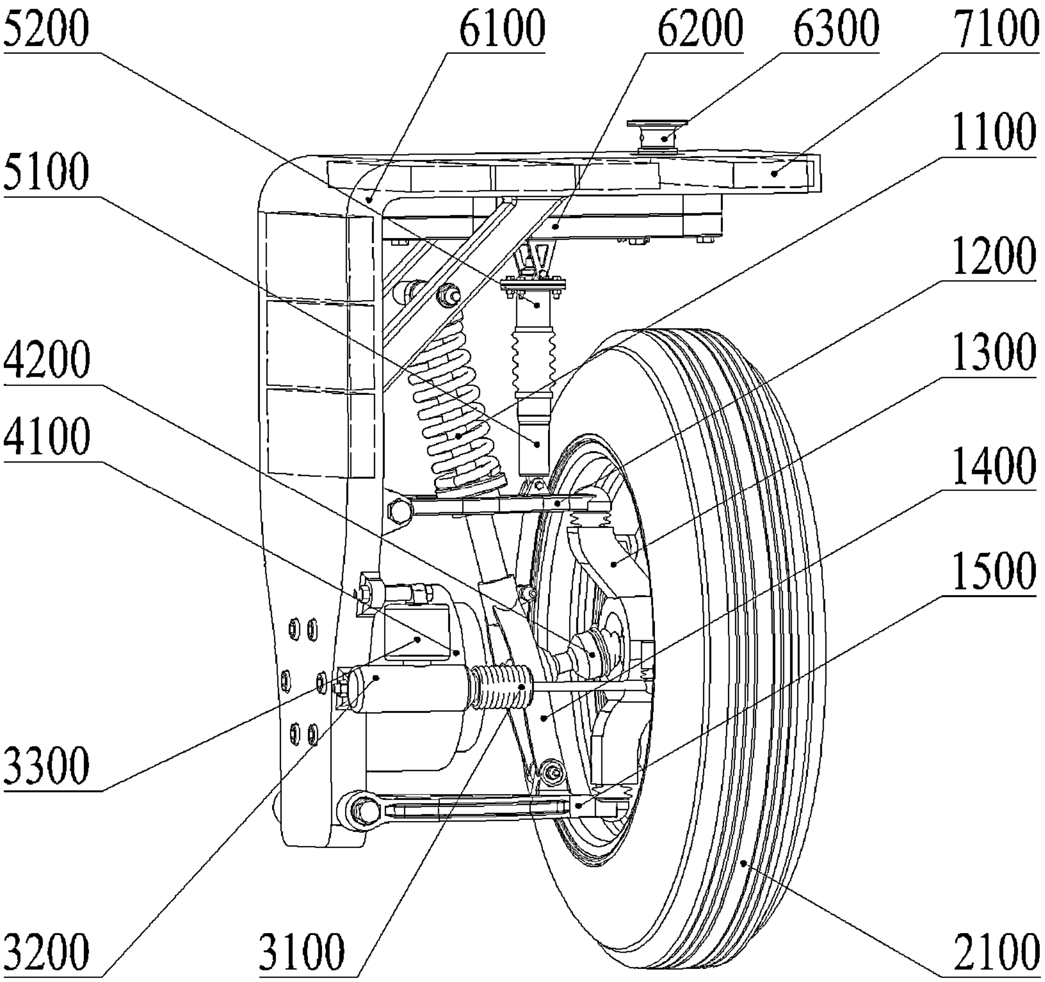
FIG. 1 is an axonometric diagram of a self-energy storage wheel corner module integrating omni-directional redundant steering and energy regenerative suspension according to an embodiment of the present application.

The present disclosure provides a self-energy storage wheel corner module integrating omni-directional redundant steering and energy regenerative suspension, as shown in FIG. 1, mainly including a suspension system 1000, a wheel assembly 2000, a first steering system 3000, a drive system 4000, an actuator assembly 5000, a second steering system 6000 and an energy storage system 7000.

The suspension system 1000 has an unequal-length double wishbone suspension structure, equipped with coil springs and shock absorbers to cushion road impact, improve riding smoothness, and retain wheel positioning parameters design. The suspension system 1000 includes a shock absorber assembly 1100, an upper wishbone 1200, a steering knuckle 1300, a shock absorber bracket 1400; and a lower wishbone 1500.

The steering knuckle 1300 includes the upper ball joint socket and a lower ball joint socket. The connection line between the center of the upper ball joint socket and the center of the lower ball joint socket is configured as a king pin. The center of the steering knuckle is provided with a second through-hole to mount the hub bearing. A brake caliper lug is provided on the front side of the steering knuckle, while a steering rod support arm is provided on the rear side of the steering knuckle. The brake caliper lug and the steering rod support arm are both provided with threaded holes to facilitate the installation of the brake caliper and the steering rod.

The lower wishbone 1500 has an A-shaped structure and is equipped with two second swing arms intersecting with each other and a first cross arm. The intersection of the two second swing arms is provided with a second ball joint socket. The second ball joint socket is connected to the lower ball joint socket through a second ball joint. The center of the second ball joint forms the bottom dead center of the king pin. An end of each of the two second swing arms away from the intersection of the two second swing arms is provided with a second boss with a third through-hole to install a pin shaft. The top surface of the first cross arm is provided with a shock absorber lug, and the shock absorber lug is provided with a through-hole to install a pin shaft. The upper wishbone 1200 includes two first swing arms intersecting with each other. The intersection of the two first swing arms is provided with a first ball joint socket. The first ball joint socket is connected to an upper ball joint socket of the steering knuckle through a first ball joint. The center of the first ball joint forms the top dead center of the king pin. An end of each of the two first swing arms away from the intersection of the two first swing arms is provided with a first boss with a first through-hole to install a pin shaft. The top surface of the upper wishbone is provided with a first actuator lug, and the first actuator lug is provided with a through-hole to install a pin shaft. The shock absorber assembly 1100 can move freely through the space between the two first swing arms without interference.

The shock absorber assembly 1100 includes the coil spring and the shock absorber. The coil spring is coaxially arranged with the shock absorber. The shock absorber assembly 1100 moves along the axis and generates corresponding resistance. The upper portion of the shock absorber assembly is connected to a reinforcement rib of a steering arm of the second steering system through a second pin shaft. The bottom of the shock absorber assembly is provided with a support rod. The upper portion of the shock absorber bracket 1400 is fixedly connected to the support rod through a mounting hole, while the lower portion of the shock absorber bracket is configured to cross the drive system through two arc-shaped arms (steel plates). The lower portion of the steel plates is provided with a lower wishbone lug, the lower wishbone lug is connected to the through-hole of the shock absorber lug through a pin shaft.

Figure 2:
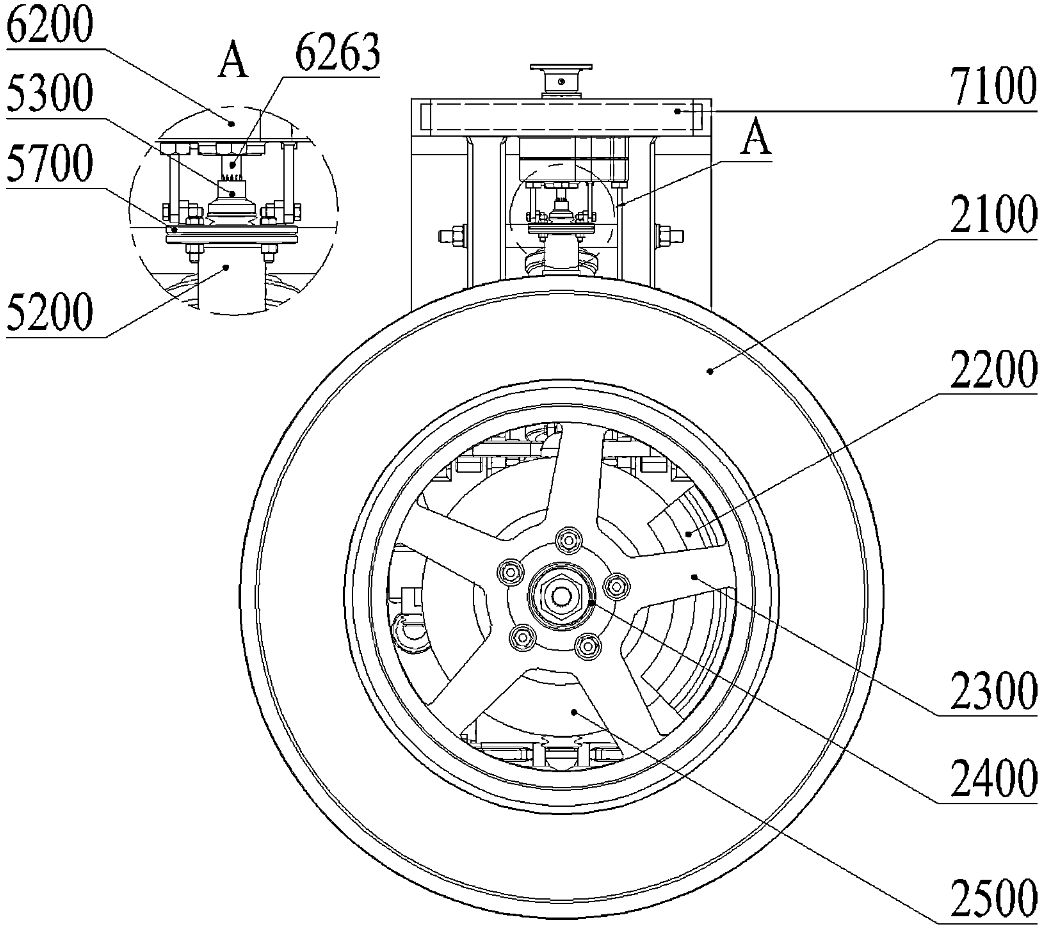
FIG. 2 is a front view of the self-energy storage wheel corner module integrating omni-directional redundant steering and energy regenerative suspension according to an embodiment of the present application.
Figure 3:
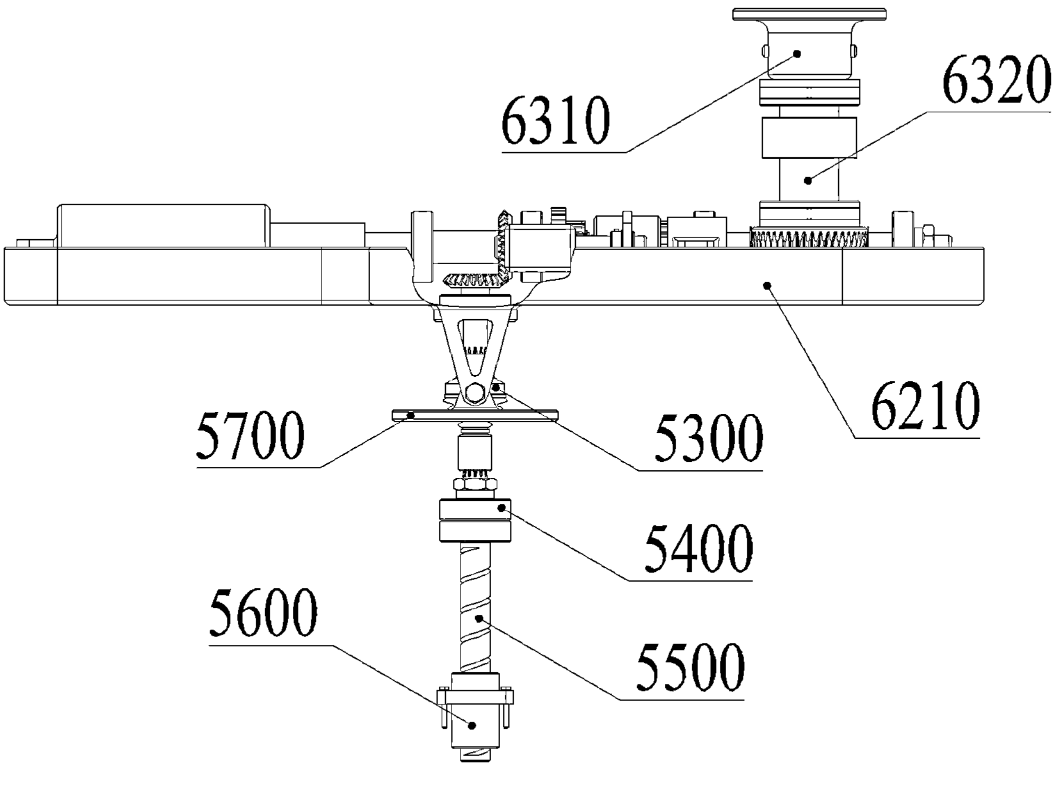
FIG. 3 is a front view of the actuator assembly of the self-energy storage wheel corner module integrating omni-directional redundant steering and energy regenerative suspension according to an embodiment of the present application.
Figure 4:
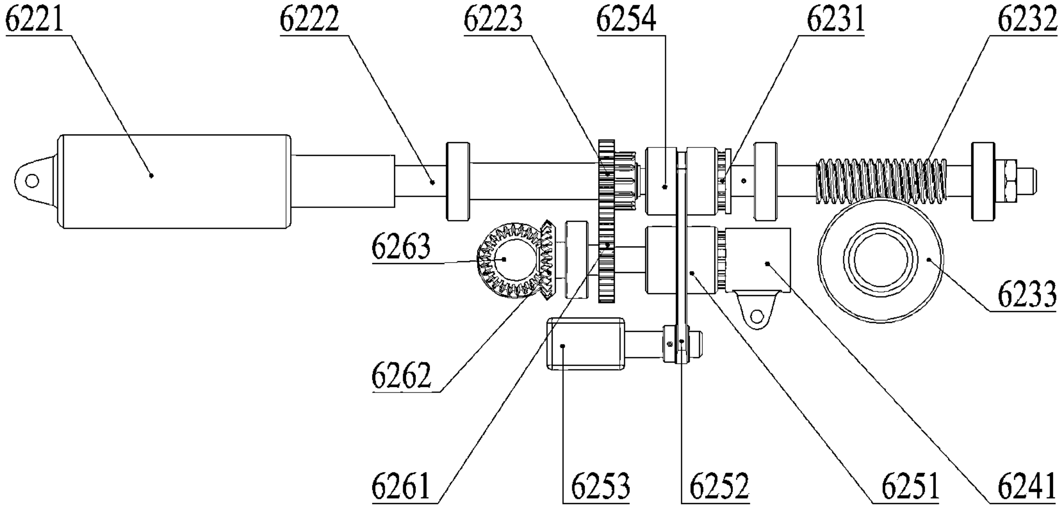
FIG. 4 is a top view of the integrator assembly of the self-energy storage wheel corner module integrating omni-directional redundant steering and energy regenerative suspension according to an embodiment of the present application.

The wheel assembly 2000 is connected to the suspension system through a hub bearing and configured to support vehicle load and transmit various torques. A braking system is integrated inside the wheel assembly 2000 for vehicle braking. As shown in FIG. 2, the wheel assembly 2000 includes a tire 2100, a brake caliper 2200, a wheel rim 2300, a hub flange 2400, and a brake disc 2500.

The first end of the hub flange 2400 is connected to the center of the wheel rim through a third bolt, while the second end of the hub flange is matched to the second through-hole of the steering knuckle through the hub bearing. A splined hole is provided inside the hub flange. The brake disc 2500 is provided between the hub flange 2400 and wheel rim 2300. The brake disc 2500 is boltedly connected to the hub flange. The brake caliper 2200 is overall in the shape of a caliper clamped onto the brake disc and leaving a braking gap. The brake caliper is provided with a second brake caliper lug that is connected to the first brake caliper lug of the steering knuckle through a second bolt.

The first steering system 3000 is configured as a primary steering system and connected to the steering knuckle of the suspension system 1000 through a steering rod. The first steering system 3000 is boltedly mounted as a whole on the rear side of the bottom of the second steering system for conventional vehicle steering featuring fast response speed and good operational dynamics. The first steering system 3000 includes the steering rod 3100; a steering gear 3200 and a first steering motor 3300.

The bottom of the first steering motor 3300 is provided with lugs and through-holes. The first steering motor is boltedly mounted at the bottom of the steering arm of the second steering system. The output shaft of the first steering motor is provided with a spline. The steering gear 3200 is configured to convert the rotational motion of the first steering motor into the linear motion of the steering rod through a transmission mechanism. The steering gear is provided with an input port and an output port, where the output port is provided with a coaxial ball joint hole and a dust cover. The housing of the steering gear is provided with a first mounting lug and is provided at the bottom of the steering arm of the second steering system. The first end of the steering rod 3100 is provided with a third ball joint socket, while the second end of the steering rod is provided with a fourth ball joint socket. The third ball joint socket is perpendicular to the axis of the steering rod and is connected to the steering rod support arm through a third ball joint. The fourth ball joint socket is arranged parallel to the axis of the steering rod and connected to the ball joint socket of the steering gear.

The drive system 4000 adopts wheel-side independent drive and is connected to the hub flange of the wheel assembly 2000 through two constant velocity universal joints to provide a driving torque for vehicle motion. The drive system 4000 is boltedly mounted on the inner side of the bottom of the second steering system. The drive system 4000 includes a drive motor assembly 4100 and an output shaft assembly 4200.

An inner rotor motor and a planetary gear reducer are integrated inside the drive motor assembly 4100. The output torque from the inner rotor motor is configured to be reduced by the planetary gear reducer to be transmitted to an output shaft of the drive motor assembly. The housing of the drive motor assembly is provided with a first threaded hole. The output shaft assembly 4200 includes a first constant velocity universal joint and a second constant velocity universal joint. The input end of the first constant velocity universal joint in splined connection with the output shaft of the drive motor assembly. The output end of the first constant velocity universal joint is fixedly connected to an input end of the second constant velocity universal joint. The output end of the first constant velocity universal joint in splined connection with the splined hole and passes through the fourth through-hole. The output shaft assembly is configured to transmit the driving torque to the hub flange, and to be axially connected with the wheel rim through an end nut to limit the wheel rim.

The actuator assembly 5000 is provided at the first upper wishbone of the suspension system 1000 and configured to actively control the attitude of the suspension system and recover wheel vibration energy. The actuator assembly includes a lower actuator housing 5100, an upper actuator housing 5200, a constant velocity universal joint 5300, a double-row angular contact ball bearing 5400, a lead screw 5500, a ball screw nut 5600 and an upper actuator cover 5700.

The lower actuator housing 5100 has a barrel-shaped in overall shape. The bottom of the lower actuator housing is provided with a second actuator lug that is connected to the actuator lug of the upper wishbone through a fourth pin shaft. The top of the lower actuator housing is provided with a first threaded hole. The upper actuator housing 5200 has a tube-shaped in overall shape. The bottom of the upper actuator housing is provided with an inner boss. The top of the upper actuator housing is provided with a flange with a second threaded hole. A dust cover is provided between the lower actuator housing and the upper actuator housing. The output end of the constant velocity universal joint 5300 passes through the through-hole of the upper actuator cover and in splined connection with the lead screw. The outer ring of the double-row angular contact ball bearing 5400 is matched with the upper actuator housing. The outer end of the double-row angular contact ball bearing is axially positioned with the upper actuator housing through a shaft sleeve and the inner boss. The lead screw 5500 is matched with the inner ring of the double-row angular contact ball bearing. The lead screw is axially positioned with the inner end of the double-row angular contact ball bearing through a locking nut and a first shaft shoulder. The top of the lead screw is splined connection with the constant velocity universal joint 5300. The ball screw nut is boltedly mounted inside the threaded hole of the lower actuator housing and configured to cooperate with the lead screw to move up and down to form a ball screw pair to achieve mutual conversion between rotational motion and linear motion. The upper actuator cover 5700 is connected to the threaded hole through a pin shaft. As shown in the partial view of FIG. 2, the through-hole in the middle of the upper actuator cover is configured to avoid interference during the operation of the third constant velocity universal joint. The top of the upper actuator cover is provided with an upper actuator lug. The axis of the upper actuator lug passes through the center of motion of the constant velocity universal joint 5300. The design of the constant velocity universal joint connected to the upper and lower pint shafts of the actuator ensures that the driven bevel gear of the second steering system does not bear vertical forces from the actuator during wheel bouncing and only bears the torque transmitted by the constant velocity universal joint. This design effectively improves the operating environment of the bevel gear, prolonging its service life. Additionally, it also prevents any motion interference of the ball screw pair caused by the swinging of the actuator during wheel bouncing, thus avoiding any adverse effects on the performance of the actuator.

The second steering system 6000 is connected to the upper wishbone and the lower wishbone of the suspension system through pin shafts. The drive system is boltedly mounted at the bottom of the second steering system. The side of the bottom of the second steering system is boltedly connected to the first steering system, and the actuator assembly 5000 is mounted on the lower side of the top of the second steering system 6000. A quick-connection port is provided on the upper side of the top of the second steering system 6000. The quick-connection port is configured to be connected to a vehicle body and positioned directly above a wheel ground contact point. The second steering system 6000 is configured as a secondary steering system for the first steering system. The second is further configured to serve as an omni-directional steering system enabling adaptation to various road conditions, and serve as an actuator to provide power and recover the excess energy of the power during the idle time. The second steering system includes a steering arm 6100, an integrator assembly 6200 and a corner module output shaft 6300.

The steering arm 6100 has an overall L-shaped bracket shape including a second cross arm and a vertical arm. The two sides of the vertical arm are connected to the through-hole on the boss of the lower wishbone through a pin shaft. The rear side of the vertical arm is provided with a first lug and a second lug. The first lug is boltedly connected to the mounting lug of the first steering motor, while the second lug is boltedly connected to the mounting lug of the steering gear. The inner side of the vertical arm is provided with a threaded through-hole that is boltedly connected to the threaded hole of the drive motor assembly. The inner side of the middle of the steering arm is provided with an upper wishbone lug that is connected to the through-hole of the upper wishbone on a boss through a pin shaft. A reinforcing rib is symmetrically provided at the L-shaped corner of the steering arm. A threaded through-hole is provided on the symmetrical reinforcing rib and is connected to the lug of the upper portion of the shock absorber assembly through a pin shaft. An upper housing of the integrator assembly is provided on the lower side of the second cross arm. A threaded hole is provided on the upper housing of the integrator assembly. A plurality of grooves are provided inside the upper housing of the integrator assembly and configured to secure an internal component of the integrator assembly. The outer side of the second cross arm is provided with a through-hole to mount a worm gear shaft. Grooves are provided throughout the interior of the steering arm and configured to mount the energy storage system. The top of the integrator assembly is boltedly connected to the threaded hole of the steering arm. The lower portion of the integrator assembly is provided with an actuator lifting lug that is connected to the lug of the upper actuator cover through a pin shaft. An output end of the integrator assembly extends from the bottom of the inner side of the integrator assembly and in splined connection the input shaft of the constant velocity universal joint 5300 of the actuator assembly. The top of the outer side of the integrator assembly is provided with a port to be connected to a corner module output shaft. The integrator assembly includes a lower integrator housing 6210, a second steering motor 6221, a shaft part 6222, a driving gear 6223, a worm shaft 6232, a coupling 6231, a worm wheel 6233, a torsion spring 6241, a first coupling sleeve 6251, a second coupling sleeve 6254, a shift fork 6252, a shifting motor 6253, a driven gear shaft 6261, a drive bevel gear 6262 and a driven bevel gear shaft 6263. The corner module output shaft 6300 includes a quick-connection port 6310 and a worm gear shaft 6320. The top of the quick-connection port is connected to the vehicle body, allowing the quick assembly and disassembly of the vehicle body with the wheel corner module. The top of the worm gear shaft is connected to the quick-connection port through a cylindrical pin, The bottom of the worm gear shaft is fixedly connected to the output shaft of the integrator assembly; and the middle of the worm gear shaft is matched with the through-hole of the outer side of the steering arm through two thrust bearings and a deep groove ball bearing.

The top of the lower integrator housing 6210 is boltedly connected to the threaded hole of the steering arm. The bottom of the lower integrator housing is provided with the actuator lifting lug that is connected to the lug of the upper actuator cover. A plurality of grooves are provided inside the lower integrator housing and configured to secure an internal component of the integrator assembly. The second steering motor 6221 is boltedly mounted inside the upper integrator housing and the lower integrator housing. The second steering motor is configured to serve as a steering motor for the second steering system, while also serving as an actuation motor for the actuator assembly. The second steering motor is an inner rotor motor. The shaft part 6222 is mounted inside the upper integrator housing and the lower integrator housing through a deep groove ball bearing. The first end of the shaft part is in splined connection with the output shaft part. The middle of the shaft part is provided with a shaft shoulder, a gear spline, and a snap spring groove. The second end of the shaft part is provided with a spline. The side of the driving gear 6223 is provided with a first spline tooth which is an external splined tooth. The driving gear is axially fixed to the shaft part through a shaft shoulder and a snap spring. The driving gear is matched with the shaft part through a needle roller bearing. The outer side of the coupling 6231 is provided with a spline tooth, and equipped with a shaft shoulder to limit the axial displacement of the coupling sleeve, while the inner side of the coupling is connected to the worm shaft through a pin hole. The middle of the worm shaft 6232 is provided with a worm. The two ends of the worm shaft are matched with the upper integrator housing and the lower integrator housing through angular contact ball bearings. The worm shaft is configured for axial displacement by fixing the angular contact ball bearings. The worm wheel 6233 is engaged with the worm. A side of the worm wheel is fixedly connected to the worm shaft. The exterior of the torsion spring 6241 is boltedly connected to the upper integrator housing and the lower integrator housing. The outer end of the interior of the torsion spring is provided with a spline tooth. The torsion spring is configured to be connected to the actuator assembly to provide torsional stiffness to the actuator assembly and improve the stiffness of the suspension system. A first end of the driven gear shaft 6261 is provided with a spline groove that is connected to a spline of the first coupling sleeve. The middle of the driven gear shaft is provided with a spur gear that is engaged with the driving gear. A second end of the driven gear shaft is provided with a spline and a snap spring groove. The driven gear shaft is internally matched with the upper integrator housing and the lower integrator housing through an angular contact ball bearing. The drive bevel gear 6262 is fixedly connected to the driven gear shaft through a spline and a snap spring. A first end of the driven bevel gear shaft 6263 is provided with a driven bevel gear that is engaged with the drive bevel gear. A second end of the driven bevel gear shaft is provided with a spline and is connected to the input end of the constant velocity universal joint of the actuator assembly. The driven bevel gear shaft is matched with the lower integrator housing through an angular contact ball bearing that is fixed by the shaft shoulder. The shifting motor 6253 is a linear motor. A primary part of the shifting motor is fixedly embedded inside the upper integrator housing and the lower integrator housing. The shift fork 6252 is connected to the first coupling sleeve and the second coupling sleeve through the shift fork grooves. The exterior of the shift fork is provided with a boss and the third boss is drilled with a pin hole. A secondary part of the shifting motor is connected to the shift fork through a cylindrical pin. The interior of the second coupling sleeve 6254 is in splined connection with the second steering motor. A first end of the second coupling sleeve is connected to the spline tooth of the driving gear through a spline tooth. A second end of the second coupling sleeve is connected to the spline tooth of the coupling through a spline tooth. A spline groove is provided inside the first coupling sleeve 6251, and one end of the first coupling sleeve is provided with a spline tooth that is configured to be engaged with the spline tooth of the torsion spring to transmit torque. The middle of the outer side of the first coupling sleeve is provided with a shift fork groove that is configured to be connected to the spline tooth of the torsion spring.

The energy storage system 7000 is provided inside the second steering system 6000 and configured to provide electric energy for the drive system, the braking system, the actuator assembly, and the first steering system and the second steering system during operation, as well as recover and store the wheel vibration energy absorbed by the actuator assembly. The energy storage system 7000 includes a blade battery 7100 that is embedded inside the second steering system. The blade battery is configured to provide electric energy for the drive system, the braking system, the actuator assembly, and first steering system and the second steering system, as well as store electric energy recovered by the actuator. The blade battery is further configured to enhance the stiffness of the steering arm due to the excellent mechanical properties thereof. The installation of the blade battery in the wheel corner module, which is closer to various energy-consuming components compared to the traditional installation in the vehicle body, effectively reduces the length of internal wiring in the vehicle. This reduction in wiring length helps decrease power consumption during the transmission process within the vehicle.

The present application also provides a control method with a working mode of the self-energy storage wheel corner module integrating omni-directional redundant steering and energy regenerative suspension, the working mode. The working mode includes an ordinary steering mode, an omni-directional steering mode and a steering failure fault-tolerant mode. The steering failure fault-tolerant mode is configured to operate based on two cases, including where it is not required to perform steering or it is only required to perform steering at an angle below a threshold angle and where it is required to perform steering at an angle above the threshold angle.

In the ordinary steering mode, the first steering system is configured to be responsible for steering; the first steering system is configured to control a wheel to perform trapezoidal steering based on a hand steering wheel rotation angle signal; the wheel corner module is configured to be locked to lose an omni-directional steering function due to a worm-worm gear self-locking effect; a shifting motor of the second steering system is configured to be controlled to retract to actuate an execution motor of the second steering system to be connected to the actuator assembly, the execution motor and the actuator assembly are configured to function as an actuating motor for active control of the suspension system or recovery of wheel vibration energy.

In the omni-directional steering mode, the first steering system is configured to stay in an idle state, and the shifting motor of the second steering system is configured to extend to actuate the execution motor to be connected to a transmission shaft of the wheel corner module; under the action of the second steering system, the wheel corner module is configured to perform omni-directional steering relative to the body of the vehicle; the shifting motor is configured to actuate the actuator assembly to be connected to a torsion spring, so as to compensate for suspension stiffness loss and ensure suspension rolling stiffness after the execution motor does not perform a suspension actuation function.

In the steering failure fault-tolerant mode, the second steering system is configured to serve as a backup system for the first steering system; and in response to a case that the first steering system suffers from a failure, the second steering system is configured to operate according to a specific situation.

In a first case where it is not require to perform steering or it is only required to perform steering at an angle below a threshold angle, the shifting motor is configured to retract to actuate the execution motor to be connected to the actuator assembly; and the execution motor and the actuator assembly are configured to function as the actuating motor for active control of the suspension system or recovery of the wheel vibration energy; the wheel corner module is configured to be locked due to the worm-worm gear self-locking effect; the drive system is configured to be adjusted to implement adaptive differential or differential drive steering by controlling drive torques of left and right wheels, so as to achieve straight driving or minor-angle steering.

In a second case where it is required to perform steering at an angle above the threshold angle, the shifting motor is configured to extend to actuate the execution motor to be connected to the transmission shaft of the wheel corner module; under the action of the second steering system, the wheel corner module is configured to perform omni-directional steering relative to the body of the vehicle; the shifting motor is configured to actuate the actuator assembly to be connected to the torsion spring to compensate for the suspension stiffness loss and ensure the suspension rolling stiffness after the execution motor does not perform the suspension actuation function.

Figure 7:
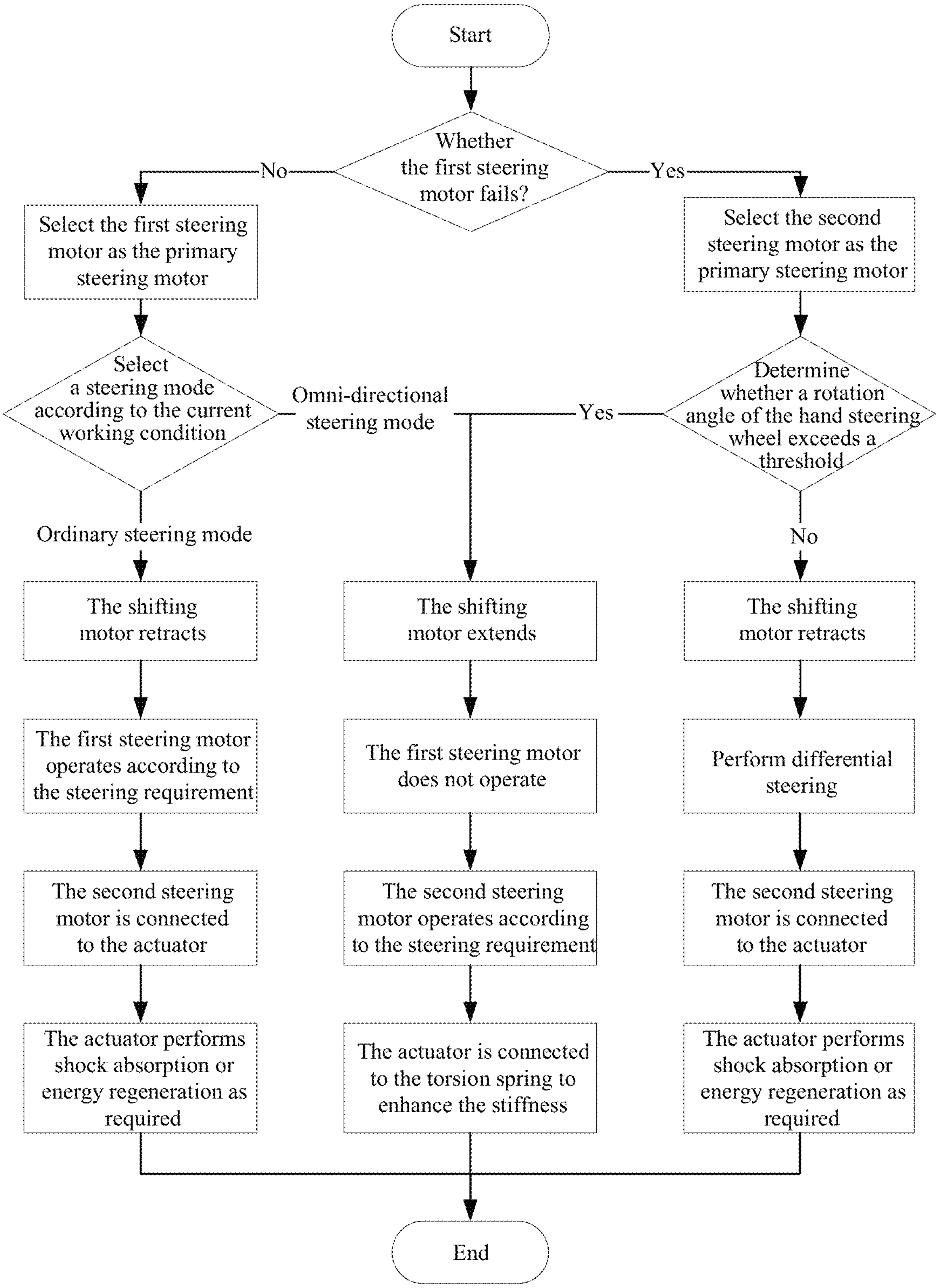
FIG. 7 is a control flowchart of the self-energy storage wheel corner module integrating omni-directional redundant steering and energy regenerative suspension according to an embodiment of the present application.

The specific processes of the above control method are shown as FIG. 7 and include the following steps.

(S0) Start.

(S1) Whether the first steering motor has failed is determined. If yes, S2 is proceeded; otherwise, S3 is proceeded.

(S2) The first steering motor is selected as the primary steering motor and S4 is proceeded.

(S3) The second steering motor is selected as the primary steering motor and S5 is proceeded.

(S4) The steering mode is selected based on the current working conditions. If the ordinary steering mode is selected, S6 is proceeded; if the omni-directional steering mode is selected, S7 is proceeded.

(S5) Whether a rotation angle of the hand steering wheel exceeds a threshold is determined. If yes, proceed to S7; otherwise, S8 is proceeded.

(S6) The shifting motor is retracted, and S9 is proceeded.

(S7) The shifting motor is extended, and S10 is proceeded. (S8) The shifting motor is retracted, and S11 is proceeded.

(S9) The first steering motor operates according to the steering requirement and S12 is proceeded.

(S10) The first steering motor does not operate and S13 is proceeded. (S11) Perform differential steering and S14 is proceeded.

(S12) The second steering motor and the actuator are connected and S15 is proceeded.

(S13) The second steering motor operates based on the steering requirement and S16 is proceeded.

(S14) The second steering motor to the actuator is connected and S17 is connected.

(S15) The actuator performs shock absorption or energy regeneration as required and S18 is proceeded.

(S16) The actuator is connected to the torsion spring to enhance the stiffness and S18 is proceeded.

(S17) The actuator performs shock absorption or energy regeneration as required and S18 is proceeded.

(S18) End.

The operation principles of each system assembly are described as follows.

Specifically, the operation principle of the suspension system is described as follows. During the driving process, the tires of the wheel system encounter uneven road surfaces, the impact is transmitted to the bore of the steering knuckle through the wheel rim, hub flange and hub bearing. The steering knuckle, via the upper and lower ball joint sockets through ball joints, transfers the road impact to the upper and lower wishbones. The lower wishbone transmits the road impact to the shock absorber bracket through its upper lug and the pin shaft. This impact is then cushioned by the spring and damper within the shock absorber assembly, mitigating the effects of the road impact. Moreover, the upper wishbone transfers the road impact to the actuator via its upper lug through pin shaft. The actuator suppresses the vibration of the suspension system or regenerates the energy thereof through its axial movement.

Specifically, the operation principle of the drive system is described as follows. The drive motor receives a driving signal and outputs torque on its output shaft. Internally, the input shaft of the planetary gear of the drive motor assembly receives the torque transmitted from the output shaft of the drive motor, which is then decelerated and increased torque. This torque is outputted to the output shaft of the drive motor assembly. The output shaft assembly transmits the driving torque to the spline of the output shaft through two constant velocity universal joints, and the driving torque is then transmitted to the spline of the hub flange of the wheel assembly. The hub flange, via external bolts, transfers the torque through the wheel rim to the tire, ultimately transmitting it to the ground, enabling the vehicle's driving operation.

Specifically, the operation principle of the braking system is described as follows. The brake caliper clamps the brake disc by braking force. The braking force is generated through friction pads. This force is then transmitted to the ground via bolts passing through the wheel rim and tire to create braking force.

Specifically, the operation principle of the first steering system is described as follows. In the ordinary steering mode, the first steering system serves as the primary steering system. During this mode, the first steering motor receives steering signals from the first steer motor and outputs steering torque through its output shaft. The steering gear receives the steering torque from the output shaft of the first steering motor and converts it into steering force, which is then outputted through the ball joint socket at the output end. The steering rod receives the steering force from the steering gear and transfers it to the steering knuckle of the suspension system. This causes the steering knuckle to rotate around the king pin that is formed by the connection between the center of the upper ball joint socket and the center of the lower ball joint socket. The steering knuckle then drives the entire wheel assembly to steer via the hub flange, thereby achieving steering movement.

Figure 5:
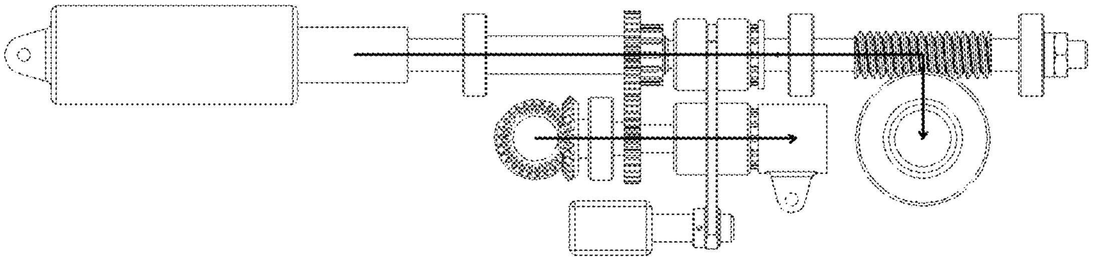
FIG. 5 is a torque transmission route diagram of the integrator assembly of the self-energy storage wheel corner module integrating omni-directional redundant steering and energy regenerative suspension according to an embodiment of the present application (shifting motor extension state)
Figure 6:
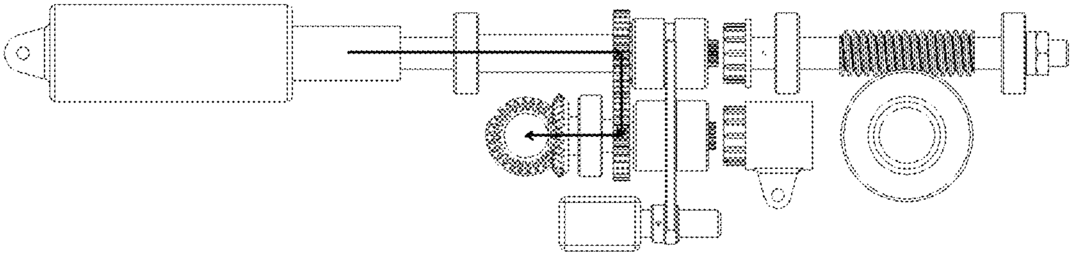
FIG. 6 is a torque transmission route diagram of the integrator assembly of the self-energy storage wheel corner module integrated with omni-directional redundant steering and energy regenerative suspension according to an embodiment of the present application (shifting motor is in a retraction state)

Specifically, the operation principles of the second steering system and the actuator are described as follows. In the omni-directional steering mode or steering failure fault-tolerant mode that steering at an angle above the threshold angle, the second steering motor acts as the primary steering motor. During this mode, the shifting motor extends, driving the first and second coupling sleeves to respectively engage with the worm shaft and the torsion spring via the shift fork. This causes the fixed connection between the shaft part (the shaft of the second steering motor) and the worm shaft, and the fixed connection between the driven gear shaft and the torsion spring. As shown in FIG. 5, the second steering motor receives the steering signal and outputs steering torque, which is transmitted via splines to the shaft part. Subsequently, the steering torque is transmitted to the worm shaft through the second coupling sleeve. Due to the engagement of the worm wheel and worm, the worm shaft undergoes relative displacement with respect to the worm wheel. At this point, the worm wheel is connected to the vehicle body via the output shaft of the wheel corner module. Therefore, the steering torque output by the second steering motor is transformed into a torque that rotates the worm shaft around the worm wheel. In this structure, the worm shaft, through shaft shoulders, allows angular contact ball bearings on both sides to match with the upper and lower housings of the integrator assembly. Consequently, the worm shaft can transmit the rotational torque through the angular contact ball bearings to the upper and lower housings of the integrator assembly, thereby driving the motion of the steering bracket, and the entire wheel corner module undergoes steering motion relative to the vehicle body, achieving wheel steering. At this point, the torsion bar transmits torsional stiffness to the driven bevel gear through the drive bevel gears and driven bevel gears. Subsequently, the driven bevel gear further transmits the stiffness to the lead screw through the constant velocity universal joint, thereby enhancing the stiffness of the actuator. Within the actuator, the oscillation of the upper wishbone caused by wheel bounce is converted into relative motion between the lead screw and the ball screw nut of the actuator through the upper and lower housing of the actuator. The torsion spring, connected to the lead screw through a series of intermediate connections, indirectly increases the force required for the relative motion of the upper and lower housing of the actuator, thereby improving the motion stiffness of the actuator. In the case of ordinary steering mode or steering failure fault-tolerant mode where steering at an angle below angle threshold, the shifting motor retracts to drive the driving gear engaging with the second coupling sleeve via the shift fork, causing the shaft part to connect with the driven bevel gear shaft via the driving gear and the driven gear. As shown in FIG. 6, due to the self-locking action of the worm and worm wheel, the output shaft of the wheel corner module cannot undergo relative displacement with the actuator assembly, thus achieving self-locking of the second steering system. At this point, the second steering motor acts as the actuator motor to drive the actuator motion or energy regeneration. The actuating torque outputted by the second steering motor is transmitted through the output shaft to the shaft part. Then, it is transmitted via splines to the second coupling sleeve, which, through splined teeth, transfers the actuating torque to the driving gears and the driven gears. The driven gear, through splines, transfers the actuating torque to the driven gear shaft, which then, through the drive bevel gears and driven bevel gears, transfers the actuating torque to the input shaft of the constant velocity universal joint. The constant velocity universal joint, after changing or not changing the torque direction, transmits the actuating torque to the lead screw. At this point, the rotation of the lead screw converts into actuating force in the vertical direction through the ball screw pair composed of the ball screw nut and lead screw. This force is then transmitted to the upper and lower actuator housings through angular contact ball bearings and bolts, respectively. The upper actuator housing, through bolts via the actuator cover, transfers the actuating force to the second steering system, and then to the vehicle body. Meanwhile, the lower actuator housing transfers the actuating force to the upper wishbone through the pin shaft, and then to the road surface via the wheel assembly. Ultimately, this achieves the suppression of suspension vibration by the second steering motor. Similarly, suspension vibrations can also be transmitted through the same path to the second steering motor to achieve energy recovery of the suspension vibration.

The present application has been described above with reference to the embodiments, but is not limited thereto. It should be understood that though the present application has been described in detail, those skilled in the art can still make various variations, modifications and replacements to the technical features recited in the embodiments. Those variations, modifications and replacements made without departing from the spirit of the present application shall fall within the scope of the present application defined by the appended claims.

What is claimed is:

1. A self-energy-storage wheel corner module integrating omni-directional redundant steering and energy regenerative suspension, comprising:

a suspension system;

a wheel assembly;

a first steering system;

a drive system;

an actuator assembly;

a second steering system; and an energy storage system;

wherein the suspension system has an unequal-length double wishbone suspension structure comprising an upper wishbone and a lower wishbone;

the suspension system comprises a coil spring and a shock absorber;

the suspension system is configured to cushion road impact, improve riding smoothness, and determine wheel alignment parameters;

the wheel assembly is connected to the suspension system through a hub bearing;

the wheel assembly is configured to support a load of a vehicle and transmit torques;

a braking system is integrated inside the wheel assembly for braking;

the first steering system is configured as a primary steering system;

the first steering system is connected to a steering knuckle of the suspension system through a steering rod;

the drive system is configured to adopt a wheel-side independent drive;

the drive system is connected to a hub flange of the wheel assembly through a first constant velocity universal joint and a second constant velocity universal joint to provide a driving torque for vehicle motion;

the actuator assembly is provided at the upper wishbone of the suspension system;

the actuator assembly is configured to actively control an attitude of the suspension system and recover wheel vibration energy;

the second steering system is configured as a secondary steering system;

the second steering system is connected to the upper wishbone and the lower wishbone of the suspension system respectively through a first pin shaft;

the drive system is provided at a bottom of the second steering system through a first bolt;

the first steering system is provided on a side of the second steering system;

the actuator assembly is mounted on a lower side of a top of the second steering system;

a quick-connection port is provided on an upper side of the top of the second steering system for connection with a body of the vehicle;

the quick-connection port is positioned directly above a wheel-ground contact point;

the second steering system is configured to serve as a redundant system for the first steering system, and serve as an omni-directional steering system to enable agile movement of the vehicle;

the second steering system is further configured to supply a power to the actuator assembly during an idle period and recover excess energy of the power;

the energy storage system is provided inside the second steering system; and the energy storage system is configured to provide electric energy for the drive system, the braking system, the actuator assembly, the first steering system and the second steering system during operation, and recover and store the wheel vibration energy absorbed by the actuator assembly.

2. The self-energy-storage wheel corner module of claim 1, wherein the suspension system comprises:

a shock absorber assembly;

the upper wishbone;

the steering knuckle;

a shock absorber bracket; and the lower wishbone;

wherein the shock absorber assembly comprises the coil spring and the shock absorber;

the coil spring is coaxially arranged with the shock absorber;

an upper portion of the shock absorber assembly is connected to a reinforcement rib of a steering arm of the second steering system through a second pin shaft;

a bottom of the shock absorber assembly is provided with a support rod;

the upper wishbone comprises two first swing arms intersecting with each other;

an intersection of the two first swing arms is provided with a first ball joint socket;

the first ball joint socket is connected to an upper ball joint socket of the steering knuckle through a first ball joint;

an end of each of the two first swing arms away from the intersection of the two first swing arms is provided with a first boss with a first through-hole;

a top surface of the upper wishbone is provided with a first actuator lug;

the shock absorber assembly is configured to move freely through a space between the two first swing arms;

the steering knuckle comprises the upper ball joint socket and a lower ball joint socket;

a connection line between a center of the upper ball joint socket and a center of the lower ball joint socket is configured as a king pin;

a center of the steering knuckle is provided with a second through-hole to mount the hub bearing;

a first brake caliper lug is provided on a first side of the steering knuckle;

a steering rod support arm is provided on a second side of the steering knuckle;

the first side of the steering knuckle is opposite to the second side of the steering knuckle;

an upper portion of the shock absorber bracket is fixedly connected to the support rod through a mounting hole;

a lower portion of the shock absorber bracket is configured to cross the drive system through two arc-shaped arms;

the lower portion of the shock absorber bracket is provided with a lower wishbone lug;

the lower wishbone has an A-shaped structure;

the lower wishbone comprises two second swing arms intersecting with each other and a first cross arm;

an intersection of the two second swing arms is provided with a second ball joint socket;

the second ball joint socket is connected to the lower ball joint socket through a second ball joint;

an end of each of the two second swing arms away from the intersection of the two second swing arms is provided with a second boss with a third through-hole;

a top surface of the first cross arm is provided with a shock absorber lug; and the shock absorber lug is connected to the lower wishbone lug through a third pin shaft.

3. The wheel corner module of claim 2, wherein the wheel assembly comprises:

a brake caliper;

a wheel rim;

the hub flange; and a brake disc;

wherein the brake caliper is provided with a second brake caliper lug;

the second brake caliper lug is connected to the first brake caliper lug through a second bolt;

an end of the wheel rim is provided with a spoke;

an outer portion of the wheel rim is configured to mount a tire;

a fourth through-hole is provided at a center of the wheel rim;

a first end of the hub flange is connected to the center of the wheel rim through a third bolt;

a second end of the hub flange is connected to the second through-hole through the hub bearing;

a splined hole is provided inside the hub flange;

the brake disc is fixedly connected to the hub flange;

the brake disc is configured to be clamped by the brake caliper; and a gap is provided between the brake disc and the brake caliper.

4. The wheel corner module of claim 2, wherein the first steering system comprises:

the steering rod;

a steering gear; and a first steering motor;

wherein a first end of the steering rod is provided with a third ball joint socket;

a second end of the steering rod is provided with a fourth ball joint socket;

the third ball joint socket is perpendicular to an axis of the steering rod;

the third ball joint socket is connected to the steering rod support arm through a third ball joint;

the fourth ball joint socket is arranged parallel to the axis of the steering rod;

the steering gear is configured to convert a rotational motion of the first steering motor into a linear motion of the steering rod through a transmission mechanism;

the steering gear is provided with an input port and an output port;

the output port is connected to the steering rod through a fourth ball joint;

the output port is provided with a dust cover;

a housing of the steering gear is provided with a first mounting lug;

an output shaft of the first steering motor is connected to the input port; and a housing of the first steering motor is provided with a second mounting lug.

5. The wheel corner module of claim 4, wherein the drive system comprises:

a drive motor assembly; and an output shaft assembly;

wherein an inner rotor motor and a planetary gear reducer are integrated inside the drive motor assembly;

an output torque from the inner rotor motor is configured to be reduced by the planetary gear reducer to be transmitted to an output shaft of the drive motor assembly;

a housing of the drive motor assembly is provided with a threaded hole;

the output shaft assembly comprises the first constant velocity universal joint and the second constant velocity universal joint;

an input end of the first constant velocity universal joint is in splined connection with the output shaft of the drive motor assembly;

an output end of the first constant velocity universal joint is fixedly connected to an input end of the second constant velocity universal joint;

an output end of the second constant velocity universal joint is in splined connection with the splined hole, and passes through the fourth through-hole; and the output shaft assembly is configured to transmit the driving torque to the hub flange, and to be axially connected with the wheel rim through an end nut to limit the wheel rim.

6. The wheel corner module of claim 5, wherein the actuator assembly comprises:

a first lower housing;

a first upper housing;

a third constant velocity universal joint;

a double-row angular contact ball bearing;

a lead screw;

a ball screw nut; and an upper cover provided with a fourth through-hole;

wherein a bottom of the first lower housing is provided with a second actuator lug;

the first actuator lug is connected to the second actuator lug through a fourth pin shaft;

a top of the first lower housing is provided with a first threaded hole;

a bottom of the first upper housing is provided with an inner boss;

a top of the first upper housing is provided with a flange with a second threaded hole;

a dust cover is provided between the first lower housing and the first upper housing;

an output end of the third constant velocity universal joint passes through the fourth through-hole;

an exterior of the double-row angular contact ball bearing is matched with the first upper housing;

an outer end of the double-row angular contact ball bearing is configured to be axially positioned with the first upper housing through a shaft sleeve and the inner boss;

the lead screw is matched with an inner ring of the double-row angular contact ball bearing;

the lead screw is configured to be axially positioned with an inner end of the double-row angular contact ball bearing through a locking nut and a first shaft shoulder;

a top of the lead screw is in splined connection with the third constant velocity universal joint;

the ball screw nut is boltedly mounted inside the first threaded hole;

the ball screw nut is configured to cooperate with the lead screw to move up and down;

the upper cover is connected to the second threaded hole through a fifth pin shaft;

the fourth through-hole is provided at a middle of the upper cover to avoid interference during operation of the third constant velocity universal joint;

a top of the upper cover is provided with a third actuator lug; and an axis of the third actuator lug passes through a motion center of the third constant velocity universal joint.

7. The wheel corner module of claim 6, wherein the second steering system comprises:

the steering arm;

an integrator assembly comprising a second upper housing; and a corner module output shaft;

wherein the steering arm has an L-shaped bracket structure comprising a second cross arm and a vertical arm;

a first side and a second side of the vertical arm are connected to the third through-hole respectively through a fourth pin shaft; the first side of the vertical arm is opposite to the second side of the vertical arm;

a third side of the vertical arm is provided with a first lug and a second lug;

the first lug is boltedly connected to the first mounting lug;

the second lug is boltedly connected to the second mounting lug;

an inner side of the vertical arm is provided with a first threaded through-hole;

the first threaded through-hole is boltedly connected to the first threaded hole to fix the drive motor assembly;

an inner side of a middle of the steering arm is provided with an upper wishbone lug;

the upper wishbone lug is connected to the first through-hole on the first boss through a fifth pin shaft;

the reinforcement rib is symmetrically provided at a corner of the L-shaped bracket structure;

the reinforcement rib is provided with a second threaded through-hole;

the second threaded through-hole is connected to the upper portion of the shock absorber assembly;

the second upper housing is provided on a lower side of the second cross arm;

a second threaded hole is provided on the second upper housing;

a fifth through-hole is provided on an outer side of the second cross arm;

a first groove is provided throughout an interior of the steering arm to accommodate the energy storage system;

a top of the integrator assembly is boltedly connected to the second threaded hole;

an actuator lifting lug is provided at a lower portion of the integrator assembly;

the actuator lifting lug is connected to the third actuator lug through a sixth pin shaft;

an output end of the integrator assembly extends from a bottom of an inner side of the integrator assembly, and is in splined connection with an input shaft of the third constant velocity universal joint;

the corner module output shaft comprises the quick connection port and a worm gear shaft;

the quick connection port is connected to the body of the vehicle;

a top of the worm gear shaft is connected to the quick connection port through a first cylindrical pin;

a bottom of the worm gear shaft is fixedly connected to an output shaft of the integrator assembly; and a middle of the worm gear shaft is matched with the fifth through-hole through two thrust bearings and a first deep groove ball bearing.

8. The wheel corner module of claim 7, wherein the energy storage system comprises a battery;

the battery is embedded in the first groove;

the battery is configured to provide electric energy for the drive system, the braking system, the actuator assembly, the first steering system and the second steering system, and store electric energy recovered by the actuator assembly; and the battery is further configured to enhance stiffness of the steering arm.

9. The wheel corner module of claim 7, wherein the integrator assembly further comprises:

a second lower housing;

a second steering motor;

a shaft part;

a driving gear;

a worm shaft;

a coupling;

a worm wheel;

a torsion spring;

a first coupling sleeve;

a second coupling sleeve;

a shift fork;

a shifting motor;

a driven gear shaft;

a drive bevel gear; and a driven bevel gear shaft;

wherein a top of the second lower housing is boltedly connected to the second threaded hole;

a bottom of the second lower housing is provided with the actuator lifting lug connected to the third actuator lug through the sixth pin shaft;

a plurality of second grooves are provided inside the second lower housing to secure internal components of the integrator assembly;

the second steering motor is boltedly mounted inside the second upper housing and the second lower housing;

the second steering motor is configured to serve as a steering motor of the second steering system and an actuation motor of the actuator assembly;

the shaft part is mounted inside the second upper housing and the second lower housing through a second deep groove ball bearing;

a first end of the shaft part is in splined connection with an output shaft part;

a middle of the shaft part is provided with a second shaft shoulder, a gear spline, and a first snap spring groove;

a second end of the shaft part is provided with a first spline;

a side of the driving gear is provided with a first splined tooth, wherein the first splined tooth is an external splined tooth;

the driving gear is axially fixed with the shaft part through the second shaft shoulder and a first snap spring;

the driving gear is matched with the shaft part through a needle roller bearing;

a middle of the worm shaft is provided with a worm;

a first end of the worm shaft is matched with the second upper housing through a first angular contact ball bearing;

a second end of the worm shaft is matched with the second lower housing through a second angular contact ball bearing;

an outer side of the coupling is provided with a second splined tooth;

an inner side of the coupling is connected to the worm shaft through a first pin hole;

the first pin hole has a cylindrical shape;

the worm wheel is engaged with the worm;

an end of the worm wheel is fixedly connected to the worm shaft;

an exterior of the torsion spring is boltedly connected to the second upper housing and the second lower housing;

an outer end of an interior of the torsion spring is provided with a third splined tooth;

the torsion spring is configured to be connected to the actuator assembly to provide torsional stiffness to the actuator assembly and improve stiffness of the suspension system;

a first splined groove is provided inside the first coupling sleeve;

one end of the first coupling sleeve is provided with a fourth splined tooth;

the fourth splined tooth is configured to be engaged with the third splined tooth for torque transmission;

a middle of an outer side of the first coupling sleeve is provided with a first shift fork groove;

the second coupling sleeve is structurally identical to the first coupling sleeve;

an interior of the second coupling sleeve is in splined connection with the shaft part;

a first end of the second coupling sleeve is connected to the first splined tooth through a fifth splined tooth;

a second end of the second coupling sleeve is connected to the second splined tooth through a sixth splined tooth;

the second coupling sleeve is provided with a second shift fork groove;

the shift fork is connected to the first shift fork groove and the second shift fork groove;

an exterior of the shift fork is provided with a third boss;

the third boss is provided with a second pin hole;

the shifting motor is a linear motor;

a secondary part of the shifting motor is connected to the shift fork through a second cylindrical pin and the third boss;

a primary part of the shifting motor is fixedly embedded inside the second upper housing and the second lower housing;

a first end of the driven gear shaft is provided with a second splined groove, and is in splined connection with the first coupling sleeve;

a middle of the driven gear shaft is provided with a spur gear;

the spur gear is engaged with the driving gear;

a second end of the driven gear shaft is provided with a second spline and a second snap spring groove;

the driven gear shaft is internally matched with the second upper housing and the second lower housing through a third angular contact ball bearing;

the drive bevel gear is fixedly connected to the driven gear shaft through the second spline and a second snap spring;

a first end of the driven bevel gear shaft is provided with a driven bevel gear;

the driven bevel gear is engaged with the drive bevel gear;

a second end of the driven bevel gear shaft is provided with a third spline, and is connected to the third constant velocity universal joint; and the driven bevel gear shaft is integrally matched with the second lower housing through a fourth angular contact ball bearing.

10. The wheel corner module of claim 1, wherein an operation mode of the wheel corner module comprises an ordinary steering mode, an omni-directional steering mode and a steering failure fault-tolerant mode;

in the ordinary steering mode, the first steering system is configured to be responsible for steering; the first steering system is configured to control a wheel to perform trapezoidal steering based on a hand steering wheel rotation angle signal; the wheel corner module is configured to be locked to lose an omni-directional steering function due to a worm-worm gear self-locking effect; a shifting motor of the second steering system is configured to be controlled to retract to actuate an execution motor of the second steering system to be connected to the actuator assembly; the execution motor and the actuator assembly are configured to function as an actuating motor for active control of the suspension system or recovery of wheel vibration energy;

in the omni-directional steering mode, the first steering system is configured to stay in an idle state, and the shifting motor of the second steering system is configured to extend to actuate the execution motor to be connected to a transmission shaft of the wheel corner module; under the action of the second steering system, the wheel corner module is configured to perform omni-directional steering relative to the body of the vehicle; the shifting motor is configured to actuate the actuator assembly to be connected to a torsion spring, so as to compensate for suspension stiffness loss and ensure suspension rolling stiffness after the execution motor does not perform a suspension actuation function;

in the steering failure fault-tolerant mode, the second steering system is configured to serve as a backup system for the first steering system; and in response to a case that the first steering system suffers from a failure, the second steering system is configured to operate according to a specific situation:

in a case where it is not require to perform steering or it is only required to perform steering at an angle below a threshold angle, the shifting motor is configured to retract to actuate the execution motor to be connected to the actuator assembly; and the execution motor and the actuator assembly are configured to function as the actuating motor for active control of the suspension system or recovery of the wheel vibration energy; the wheel corner module is configured to be locked due to the worm-worm gear self-locking effect; the drive system is configured to be adjusted to implement adaptive differential or differential drive steering by controlling drive torques of left and right wheels, so as to achieve straight driving or minor-angle steering; and in a case where it is required to perform steering at angle above the threshold angle, the shifting motor is configured to extend to actuate the execution motor to be connected to the transmission shaft of the wheel corner module; under the action of the second steering system, the wheel corner module is configured to perform omni-directional steering relative to the body of the vehicle; the shifting motor is configured to actuate the actuator assembly to be connected to the torsion spring to compensate for the suspension stiffness loss and ensure the suspension rolling stiffness after the execution motor does not perform the suspension actuation function.

* * * * *